(12) United States Patent
Waingold

(10) Patent No.: US 7,519,542 B1
(45) Date of Patent: Apr. 14, 2009

(54) SYSTEM AND METHOD FOR MODELING AND APPLYING A PEOPLE NETWORK REPRESENTATION

(75) Inventor: Elliot Waingold, Seattle, WA (US)

(73) Assignee: Versata Development Group, Inc., Austin, TX (US)

( * ) Notice: Subject to any disclaimer, the term of this patent is extended or adjusted under 35 U.S.C. 154(b) by 713 days.

(21) Appl. No.: 09/929,374

(22) Filed: Aug. 14, 2001

(51) Int. Cl.
*G06F 17/30* (2006.01)
(52) U.S. Cl. ........................................... 705/10
(58) Field of Classification Search .................... 705/10
See application file for complete search history.

(56) References Cited

U.S. PATENT DOCUMENTS

| 6,073,138 | A | | 6/2000 | de L'Etraz et al. | ........... 707/104 |
|---|---|---|---|---|---|
| 6,151,585 | A | * | 11/2000 | Altschuler et al. | ............ 705/10 |
| 6,832,245 | B1 | * | 12/2004 | Isaacs et al. | ................ 709/206 |
| 2002/0059201 | A1 | * | 5/2002 | Work | ............................. 707/3 |
| 2002/0116466 | A1 | * | 8/2002 | Trevithick et al. | ........... 709/206 |
| 2002/0178161 | A1 | * | 11/2002 | Brezin et al. | ................... 707/10 |
| 2003/0055711 | A1 | * | 3/2003 | Doherty | ....................... 705/10 |

FOREIGN PATENT DOCUMENTS

WO     WO 01/077793 A2 * 10/2001

OTHER PUBLICATIONS

Kautz et al. "The Hidden Web." American Association for Artificial Intelligence. Summer 1997.*

* cited by examiner

*Primary Examiner*—Susanna M Diaz
(74) *Attorney, Agent, or Firm*—Hamilton & Terrile, LLP; Kent B. Chambers

(57) ABSTRACT

A system and method for applying a people network representation to aid contact between a member of an organization and a target individual selects a contact path between the member and the target supported by analysis of the level of interaction between members of the organization based on network communications of the organization. The people network of the organization is modeled. Level of interaction is analyzed using network communications that take into account the recentness and frequency of interactions, such as email, ICQ, or phone interaction. To contact a targeted individual, for instance such as to obtain expertise in a desired area, the model of the people network allows determination of a contact path between the member and target which improves the likelihood of obtaining the target's expertise. A contact path from a member may include a suggestion to contact the target through one or more intervening organization members.

32 Claims, 7 Drawing Sheets

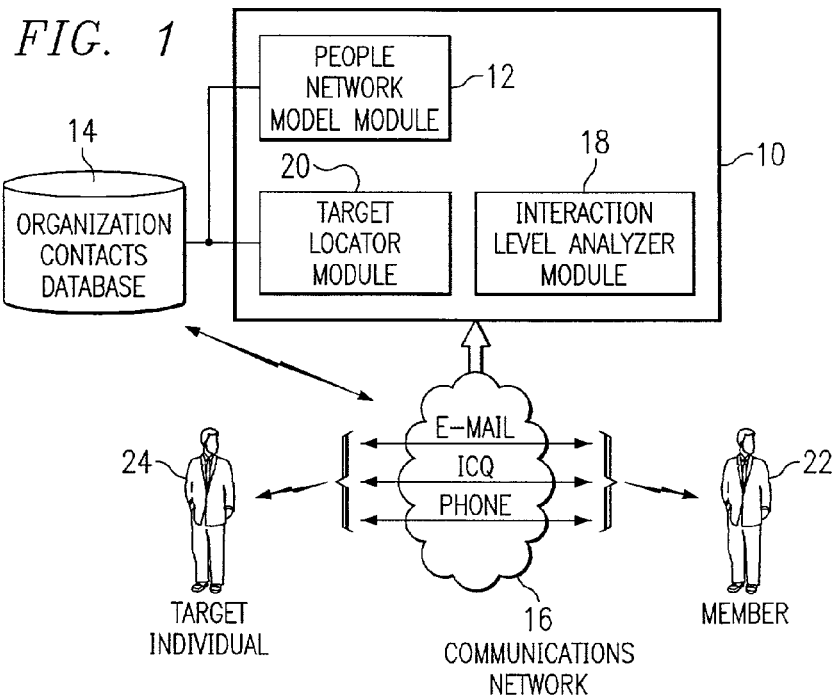
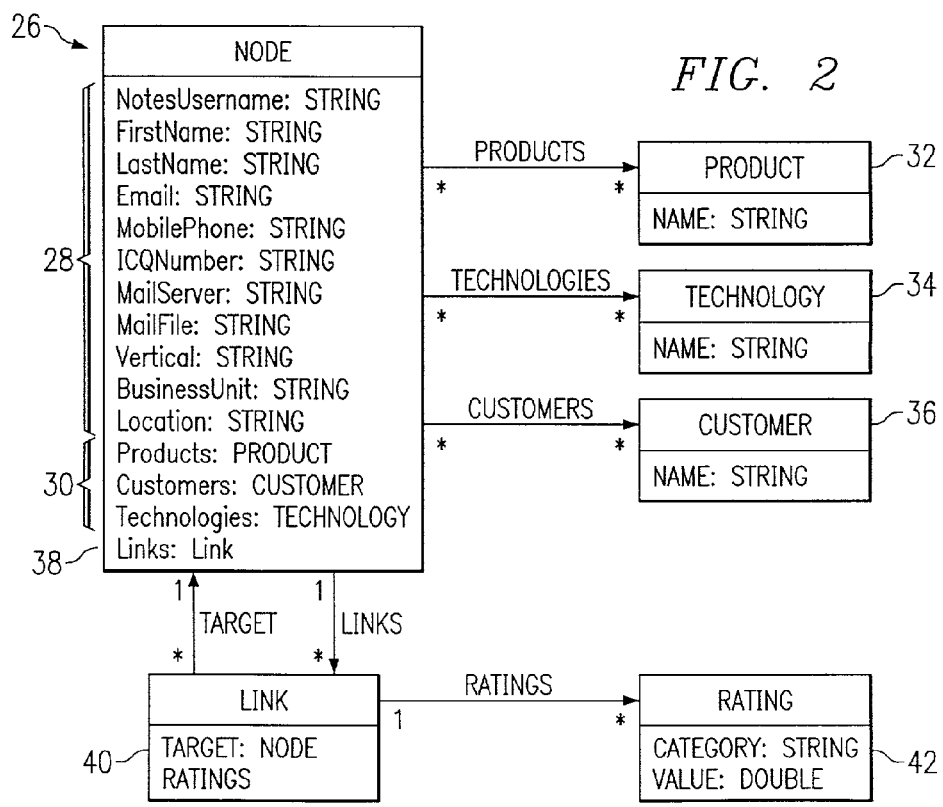

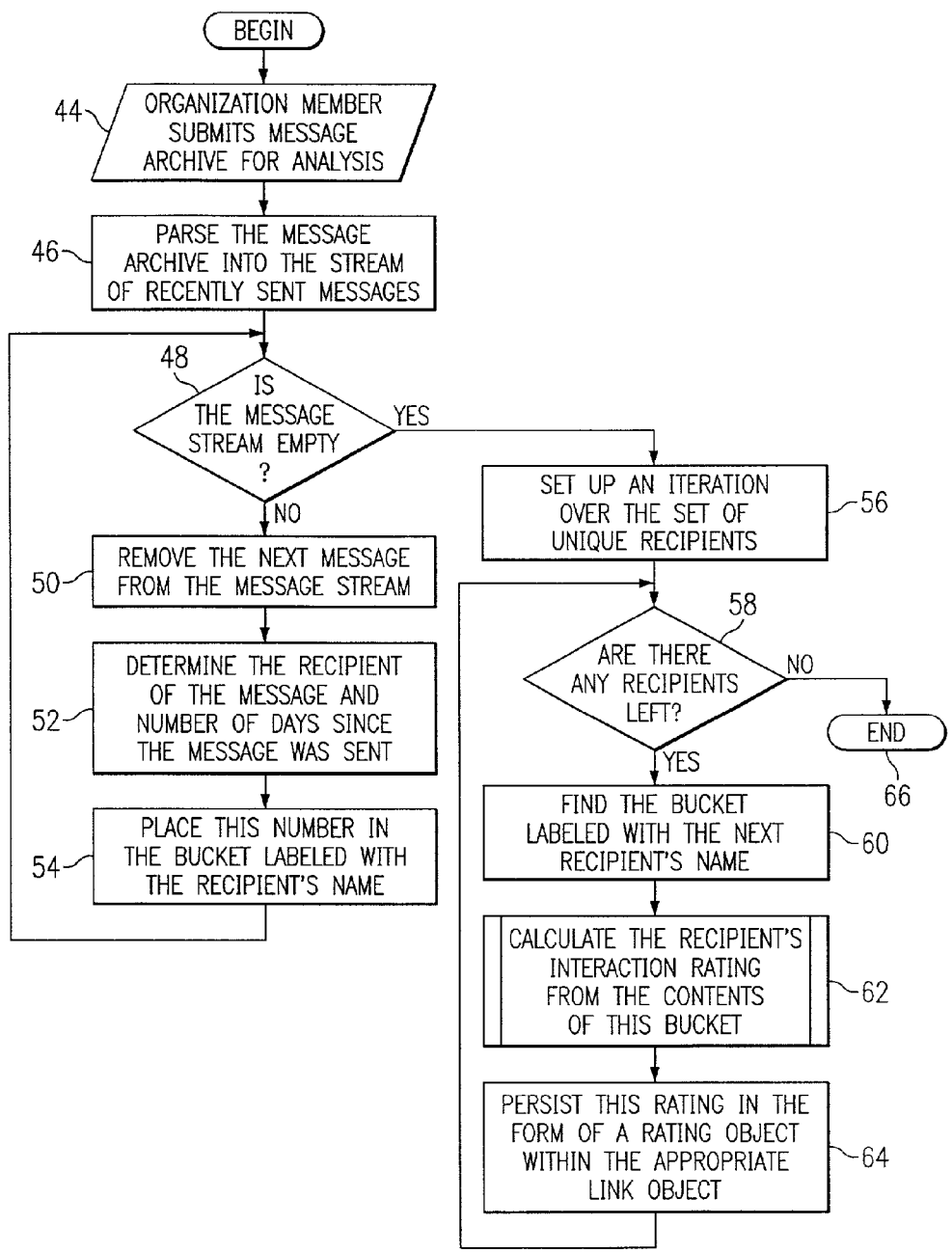

Update Your Network

Keep your knowledge network accurate and up-to-date! Import your e-mail or ICQ archive for analysis.

Analyze your e-mail archive. This may take up to a few minutes.

Analyze your ICQ message archive. This requires you to submit your local ICQ ".dat" file (What's this?):

[ Browse... ] [ Submit ]

_128_

Browse Your Network

Stay on top of your knowledge network's health! Choose one of the following graphical representations of your network.

Browse the bulls-eye view.

Browse the network view (What's this?)

Zoom Level [ One Degree ▼ ]
Min. Link Strength [ 0.0 Stars ▼ ]
[ Submit ]

_126_

Find an Expert

Find the expertise you're looking for.

Product [ --None-- ▼ ]
Customer [ --None-- ▼ ]
Technology [ --None-- ▼ ]
Location [ --Any-- ▼ ]
Bus. Unit [ --Any-- ▼ ]
Vertical [ --Any-- ▼ ]
[ Submit ]

_124_

Your Expertise

Products (Edit): Backbone Java
Customers (Edit): <None>
Technologies (Edit): EJB, CSS, HTML, Java, JavaScript, JSP, Servlets, XML

_112_

Your Connections (What's this?)

| Name | E-mail Rating | ICQ Rating | Phone Book Rating | Custom Rating | Overall Rating | Location | Business Unit | Vertical |
|---|---|---|---|---|---|---|---|---|
| John Smith | ★★★☆☆ | ☆☆☆☆☆ | ★★★★★ | ★★★☆☆ | ★★★☆☆ | Origin | Todds U | Todds |
| Larry Booth | ★★☆☆☆ | ☆☆☆☆☆ | ★★★★☆ | ★★★☆☆ | ★★★☆☆ | Origin | Todds U | Todds |
| Mary Gast | ★★★☆☆ | ★★★☆☆ | ★★★★☆ | ★★★☆☆ | ★★★☆☆ | Origin | Todds U | Todds |
| Laura Hutch | ★★★☆☆ | ☆☆☆☆☆ | ★★★★★ | ★★★☆☆ | ★★★☆☆ | Origin | Todds U | Todds |
| Jeff Bond | ★★☆☆☆ | ☆☆☆☆☆ | ★★★★☆ | ★★☆☆☆ | ★★☆☆☆ | Origin | Todds U | Todds |
| Debbie Duff | ★★☆☆☆ | ☆☆☆☆☆ | ★★★☆☆ | ★★☆☆☆ | ★★☆☆☆ | HQ | Pratesi | Todds |

Prev    Records 1–10 of 16    Next

FIG. 7

SYSTEM AND METHOD FOR MODELING AND APPLYING A PEOPLE NETWORK REPRESENTATION

TECHNICAL FIELD OF THE INVENTION

This invention relates in general to the field of computer networks, and more particularly to a system and method which models and applies a people network representation based on the level of interaction between individuals on a communications network.

BACKGROUND OF THE INVENTION

Modern business organizations depend on the "brain power" of their members in order to compete in an increasingly technology-oriented business environment. For the members of "brain-powered" organizations, success often depends on initiative, cognitive ability and technical competence applied to solve intellectually challenging workplace tasks. Another skill of nearly equal importance for these members is the skill of knowing "who to ask" when difficult tasks arise that are beyond the members' own expertise. Star performers within organizations typically develop and use robust pathways to a number of different experts in order to efficiently complete critical workplace tasks. An organization that encourages the growth and usage of such "knowledge networks" by its members stands to substantially improve the value added by its members as the right expertise is applied to difficult tasks, thus saving time and money in getting the job done right.

Most organizations have made substantial investments in communication networks to facilitate communication among members. For instance, computer networks support e-mail systems, instant messaging systems, telephone systems and voice mail systems to communicate within and outside of organizations. These communication networks are generally designed to simplify communications between members of the organization and typically include lists of contacts available to members of the organization. For example, contact list files are often available on the intranet of an organization and include phone numbers, e-mail and instant messaging addresses and other contact information. Such contact information sometimes includes the positions of the members within the organizational structure and the expertise of the members for dealing with specific issues, such as information technology.

Although communication networks have improved the ability of organization members to contact others within and outside of their organization, the problem of determining who to contact for help on particular tasks generally remains with each member. For instance, a member seeking expertise on a particular issue may attempt to "cold call" an individual with expertise, based on the individual's position with the organization. However, such cold calls often provide unpredictable results especially since a busy expert typically has little motivation or interest in helping strangers with complex problems. For this reason, effective organization members tend to rely on personal contacts or contacts-of-contacts in order to get assistance from an expert who will take a personal interest in tackling the member's problem. Thus, effective organization members invest time and effort to build and maintain a network of contacts that will aid in accomplishing workplace goals.

SUMMARY OF THE INVENTION

In accordance with the present invention, a system and method is provided that aids efficient communication of organization members. The level of interaction between organization members is analyzed based on the communications of members across a communications network. Based on the analysis of communications, a representation of the people network of the organization is modeled, allowing the determination of contact paths between a selected member of the organization and one or more target individuals.

More specifically, communications by organization members across a network are analyzed to determine the level of interaction between individual members of the organization. For instance, the people network of the organization is modeled as a directed graph and made available for members to review, use and maintain. The directed graph represents each member of the organization as a node and represents the level of interaction between members with edges between the nodes. The level of interaction is determined by analysis of the recency and frequency of communications on the network. For instance, a set of weights associated with an edge of the directed graph represents the relative rating of interaction between the nodes associated with the edge. A weight measures interaction for a communication medium, such as the recency and frequency of e-mail messages between the members represented by the nodes, with each edge having a weight for each medium. An aggregate of the edge values provides and interaction rating that measures the level of interaction for sets of weights.

In one embodiment, a people network representation for a member of an organization provides one or more contact paths to aid the member in establishing communication with one or more target individuals. A selected member of the organization requests help in obtaining expertise in a desired subject matter, such as a product, technology or customer. The selected member's level of interaction to a predetermined degree of nodes within the people network is analyzed to determine one or more contact paths between the member and target individuals that have the requested expertise and at least a predetermined level of interaction with the member. For instance, a target locator module identifies a list of experts responsive to the selected member's request and within a predetermined number of nodes of the selected member. An interaction level analyzer module then analyzes the strength of the contact paths between the selected member and the target individuals with a strongest path analysis of the directed graph model as provided by a people network model module. The experts having stronger contact paths based on the interaction level analysis will provide a better likelihood of obtaining a successful solution to the member's task.

In another embodiment, the people network of a selected member is presented as graphical visualizations to aid the member in using and maintaining his people network. For instance, a predetermined degree of nodes of the member's people network and edges between the nodes are depicted as circles connected as lines. The lines reflect the level of interaction, such as through the use of different colors. As another example, degrees of nodes are depicted as a bullseye with the selected member at the center and the successive rings outward from the center representing strong to less-strong interaction ratings as the rings are located further from the center. The graphical visualization aids members of the organization in using and maintaining their people network by visually presenting information that reflects the member's interaction with other organization members. For instance, if a member sees that interaction with another member has reduced, the member can easily maintain this part of his people network by writing an email to the contact to reestablish interaction.

The present invention provides a number of important technical advantages. One example of an important technical advantage is the automatic construction and updating of an organization's people network through analysis of existing data sources. For instance, an initial representation of an organization's people network is approximated by contact information and historical data of message traffic on a communications network, such as e-mail archives. The people network is dynamically updated to refine the structure of the people network and strengths of links between members of the organization based on interaction levels dynamically tracked across network communications. Analysis of the recency and frequency of the communications ensures an up-to-date and accurate representation of the people network with only minimal intervention by members.

Another example of an important technical advantage is the ability of an organization member to successfully search for an expert to aid in solving difficult tasks. A member enters a subject matter of interest and is then presented with a ranked list of appropriate experts based on the strength of the member's contact paths to the experts. By identifying not only the expert but also intervening members of the organization, the present invention leverages the people network of the organization to improve efficiency in addressing workplace tasks by setting the right people to work on the right problems. For instance, the member is able to contact intervening members to help acquire assistance of an expert with whom the intervening member has direct or more direct contact, thus improving the likelihood that the expert will take a personal interest in addressing the task.

Another example of an important technical advantage of the present invention is that organization members are able to graphically view their people network to use the people network to help solve workplace tasks and to maintain interaction levels with other members of the organization. Members are presented with an easy-to-understand graphical visualization that helps the members to recognize how to leverage the people network. Further, members are able to replenish important links in their people network by reestablishing contact with other members.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein:

FIG. 1 depicts a block diagram of a communications network that aids the selection of a contact path for members of an organization;

FIG. 2 depicts one node of a directed graph object model of an organization's people network;

FIG. 3 depicts a flow chart for interaction analysis to determine edge weights for a member of an organization;

FIG. 7 depicts a graphical user interface that allows viewing of an organization member's people network through a web browser;

DETAILED DESCRIPTION OF THE INVENTION

Figure 4:
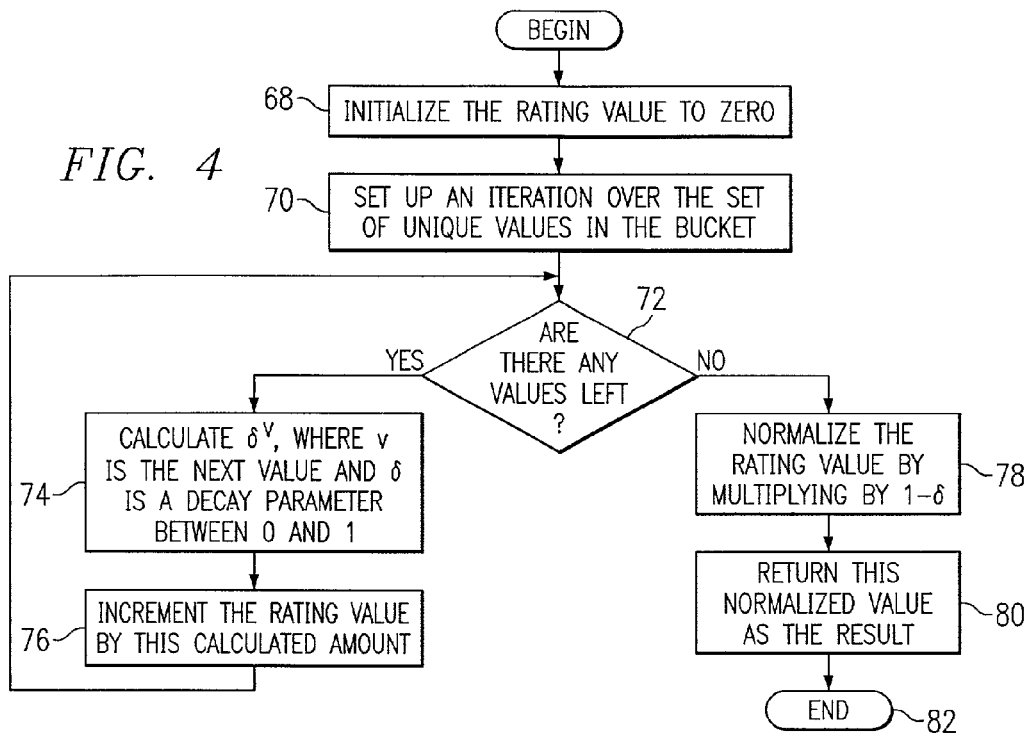
FIG. 4 depicts a flow chart for the calculation of an interaction rating using archived network communications.

Preferred embodiments of the present invention are illustrated in the Figures, like numerals being used to refer to like and corresponding parts of the various drawings.

"Brain power" organizations face complex and difficult problems that are most efficiently solved by placing the right expertise to bear. However, the diverse expertise and experience in such organizations is difficult to identify, use and update given the wide variety of problems that tend to arise and the diverse talent involved. Such organizations would benefit from the automatic construction and maintenance of a people network that aids members of the organization in communicating with each other. In addition, members of the organization are able to more effectively solve problems by determining an expert who can help with the problem based in part on the expert's relationship within the people network of the member. The methods and systems of this disclosure allows a member of an organization to monitor and maintain the member's people network and leverage that network to solve work tasks in an efficient manner.

Members of an organization excel through initiative, cognitive ability, and technical competence applied to their work. Another key to success, however, is the skill of "knowing who knows" for accomplishing work tasks effectively and efficiently when a member lacks the skill set to resolve difficult tasks without help. Successful organization members typically develop robust contact pathways to experts to obtain help in completing critical tasks in the workplace. Old fashioned networking, meaning building and utilizing a knowledge network of contacts with experts, allows members of an organization to target individuals to contact both within and outside of the organization for expert help on problems that arise in specific subject matter areas.

Referring now to FIG. 1, a knowledge network computer system 10 encourages the use and eases the maintenance of an organization's knowledge network to achieve organization goals. A people network model module 12 uses existing information sources, such as an organization contacts database 14 with phone, e-mail and ICQ contact information, to construct an initial approximation of an organization's people network and persist that approximation to a database as a people network model. The initial people network model is updated with dynamic information sources, such as the recency and frequency of interaction between organization members across a communications network 16, to refine the structure of the network and accurately model the strengths of links between members.

An interaction level analyzer module 18 applies the people network model for a selected member of the organization based on the communications of the selected member on network 16. For instance, communications with other members of the organization through digital means, such as e-mail, ICQ and telephone communications, are analyzed to provide contact paths from the selected member to other members associated with the network. A target locator module 20 allows a selected member 22 to leverage the people network for contacting a target individual 24 using a contact path that is more favorable than directly contacting the target individual. For instance, an intervening member of the organization with a strong path to the selected member 22 and the target individual 24 provides a contact path for member 22 to target individual 24 with improved likelihood of success over the likelihood of success of a direct contact by member 22 to target individual 24.

In addition, target locator module 20 applies information about expertise of individuals stored in organization contacts database 14 to aid selected member 22 in identifying and contacting experts within the organization to address specific issues. Thus, a member of the organization enters a subject matter of interest and is presented with a ranked list of appropriate experts in the subject matter with the appropriateness of each expert determined by the level of expertise and the strength of the contact path to that expert target individual from the requesting member.

People network model module 12 models the organization's people network as a directed graph in which each node of the directed graph represents a member of the organization and each edge of the directed graph represents a level of interaction from the source node to the destination node. Referring now to FIG. 2, a node of a people network object model and related database schema are depicted as a node of a directed graph. The directed graph node represents a member of the organization and that member's level of interaction with other members. A directed graph node object 26 is generated by people network model module 12 for each member of the organization. Node 26 depicts identification and contact information schema 28 as including the name, e-mail address, phone numbers and location of the individual represented by node 26. Node 26 also depicts an expertise schema 30 as including the individual's expertise in products, technologies and customers of the organization. A related product object 32, technology object 34 and customer object 36 store static properties of the represented expertise Node 26 includes a links field 38 as part of its database schema with a link object 40 for each target individual with whom interaction occurs. Link object 40 identifies the target node and provides a numerical rating for the strength of the interaction level of the edge between the source node 26 and the target node identified in link object 40. Each link object 40 represents an edge of the object model node 26 and includes a rating object 42 with a database schema that stores an interaction rating for each category of interaction. For instance, the schema includes ratings for one category of e-mail interaction.

Referring now to FIG. 3, a flow chart depicts the interaction analysis that determines an edge weight for a category of interaction as depicted by link object 40 and rating object 42. At step 44, an organization member 22 submits his message archive for analysis. For instance, member 22 submits a record of e-mails sent by that member, including the identity of the recipient of each e-mail and the time-date stamp for when the email was sent by the member. In alternative embodiments, the archive may reflect the subject matter of the e-mail or other information for analysis. Alternative types of network communications include sent ICQ messages and telephone calls made by the member along with related data for each network communication. Although the use of messages sent by member 22 provides a more accurate representation of who a member considers to be in his people network, messages received by the member may also be used to define the member's people network with an appropriate varied weighting for sent versus received messages to reflect their relative importance to the member's people network.

At step 46, member 22's message archive is parsed and filtered into a stream of recently sent messages. Filtering the messages allows flexibility regarding the recency of each message considered and elimination of aged message information. At step 48, a loop is established by determining whether the message stream is empty. If the message stream is not empty, at step 50 the next message is removed from the stream, at step 52 the recipient of the message and age of the message are determined, and at step 54 the age is placed in an appropriately labeled bucket with each recipient's name. If at step 48 the message stream is empty, then at step 56 an iteration is established over the set of unique recipients. At step 58, a loop is set up so that if recipients remain, then at step 60 the bucket labeled with the recipient's name is located, at step 62 the recipient's interaction rating is determined from the contents of the bucket, and at step 64, the interaction rating is stored as a rating object within the appropriate link object for that recipient. Once all recipients are analyzed, the process ends at step 66.

The calculation of each recipient's interaction rating at step 62 is depicted in greater detail by FIG. 4. At step 68, the rating is initialized to a value of zero. At step 70, an iteration is established over the set of unique message age values in the recipient's bucket. If at step 72 there are values left in the bucket, a $\delta^v$ is calculated where v is the next value and $\delta$ is a decay parameter between zero and one. At step 76, the rating value is incremented by the $\delta^v$ calculation and the process returns to step 72 until all values are used. Once all values are used at step 72, then at step 78 the interaction rating value is normalized by multiplying the value by one minus $\delta$. At step 80, the normalized interaction rating value is returned for storage in the rating object 42 and the process ends at step 82.

Figure 5:
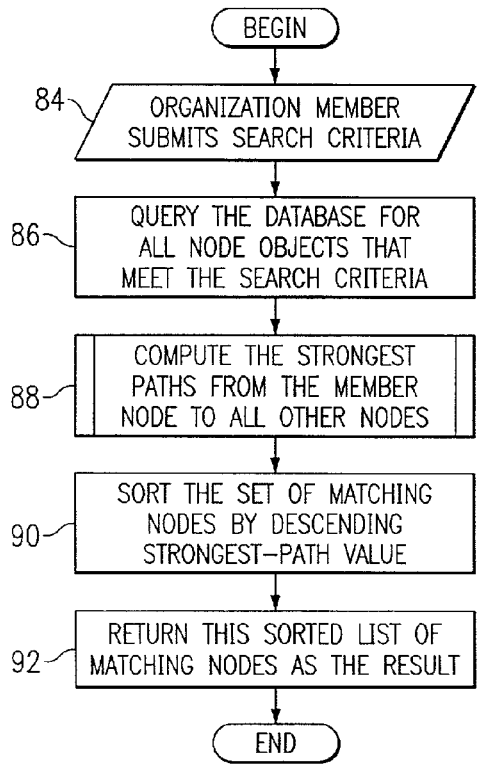
FIG. 5 depicts a flow chart for determining a contact path to a target individual.

Modeling of the people network provides important contact path information to aid member 22 in meaningful communication with a target individual 24. One application of the people network allows the member to enter a subject matter of interest into target locator module 20 of computer system 10 in order to obtain a ranked list of appropriate experts on the subject matter with the appropriateness determined by the likelihood that the target individual expert has knowledge of the subject matter and the strength of the contact path from the member 22 to the target individual 24. Referring now to FIG. 5, a flow chart depicts steps for member 22 to identify an expert in a subject matter and the appropriate contact path to the expert.

At step 84, organization member 22 submits search criteria such as the product, customer and/or technology of the expertise sought and/or demographic information relating to the desired expert, such as office location or job function. At step 86, target locator module 20 queries the people network model database for all node objects 26 that meet the search criteria. At step 88, the strongest path is computed from the member 22's node to all object nodes that met the search criteria. At step 90, the set of matching nodes are sorted by descending strongest path value and at step 92 the sorted list of matching nodes are returned to member 22 along with an annotation of the strongest contact path from member 22 to each target individual 24 qualifying as an expert.

Figure 6:
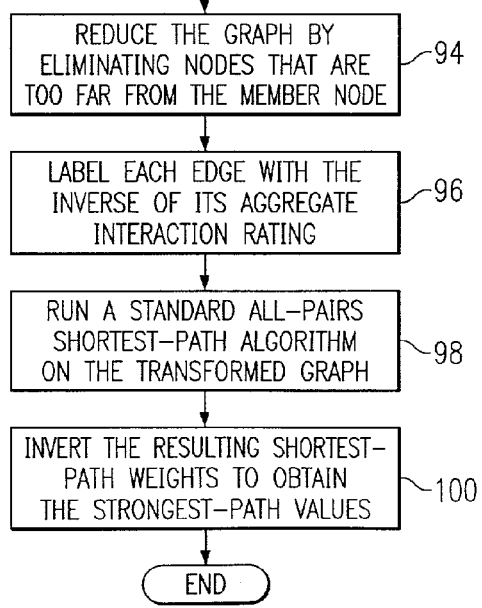
FIG. 6 depicts a flow chart for computing a strongest path between a member of an organization and a target individual.

The computation of the strongest contact path is measured by the shortness of the contact path between the member 22 and target individual 24 and the interaction levels of the edges along the contact path. Referring now to FIG. 6, a flow chart depicts the computation of the strongest path described at step 88 of FIG. 5. At step 94, the directed graph of member 22's people network is reduced by eliminating nodes that are too far from the member's node. For instance, all nodes having four intervening nodes on the contact path from the member 22 to the target 24 are eliminated as too distant on member 22's people network for the intervening nodes to offer substantial assistance.

Once member 22's people network is defined with appropriate targets, the strength of contact paths between member 22 and target individuals 24 is analyzed with shortest path analysis. At step 96, each edge between nodes of the people network is labeled with the inverse of its aggregate interaction rating. For instance, consider a contact path from member 22 to an intervening member with an aggregate interaction rating of 0.2 and then from the intervening member to the target individual with an aggregate interaction rating of 0.3. In this example, the inverse aggregate interaction ratings would have values of 5 (1/0.2) and 3.33 (1/0.3) respectively. The aggregate interaction rating is a single number representing the combination of individual interaction ratings for the various communication media, such as e-mail, ICQ or phone messages. For example, the aggregate interaction rating may be computed as an arithmetic mean function. The aggregate interaction rating of the entire path is 0.12 (1/(5+3.33)).

At step 98, a standard all-pair shortest-path algorithm is run on the transformed directed graph to find the shortest path solution for the directed graph using the inverse aggregate interaction ratings. Then, at step 100, the inverse of the shortest path weights is computed to obtain strongest path values for target individuals.

Referring now to FIG. 7, a graphical user interface 102 depicts the presentation of an organization member's people network through a web browser. A list of organization members 104 represents nodes of the requesting member's direct people network. An e-mail rating 106, ICQ rating 108 and phone book rating 110 depict the interaction level rating between the requester and each listed individual for analysis performed based on data gleaned from e-mail messages, ICQ messages and phone book information respectively. Custom rating 112 depicts the interaction level for a customized rating computed from data selected and customized by the member. The overall rating 114 depicts the aggregate interaction level for the member based on an overall analysis of interactions by the member across network communications, with different types of communication weighted at different levels. For instance, the overall rating may provide greater emphasis on data gleaned from e-mail messages as opposed to ICQ messages or telephone communications. Location column 116, business unit column 118, and vertical column 120 provide contact information for each member of the people network.

An expertise window 122 depicts the expertise of the member in products, customers and technologies. For instance, a member user viewing window 122 has expertise in Backbone Java as a product, and is able to edit that expertise as necessary. The expertise for members of the organization allows for a search, such as through window 124, so that a user member can find expertise in a particular, product, customer or technology or the user member can search for expertise in a particular location, business unit or vertical aspect of the organization. A request for an expert through window 124 leverages the requesting member's people network and interaction levels to determine contact paths to experts who will be more likely to aid the member in the requested subject matter, such as an expert with a strongest contact path value.

Instead of searching for an expert, a member user can view a graphical presentation of his people network through window 126, including various degrees of the people network and various levels of interaction for each degree. As another alternative, the member may perform an updated analysis on his people network through window 128, including analysis based on an e-mail archive or an ICQ message archive. Window 128 provides the member with the ability to import archived files of contact information, such as from the member's personal computer, to perform an interaction analysis on data not otherwise available to the network.

Figure 8:
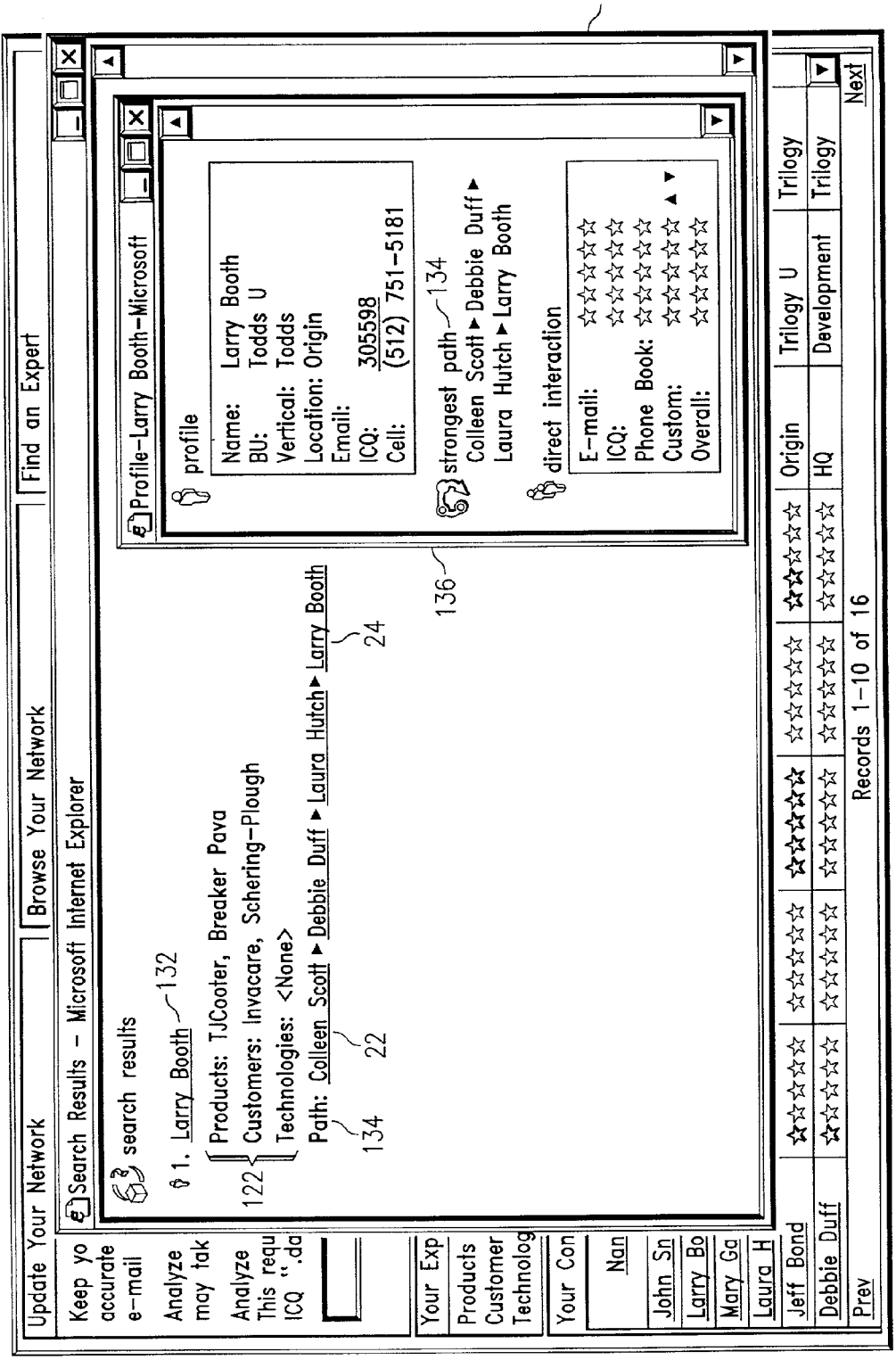
FIG. 8 depicts a graphical user interface for displaying a contact path to a target individual with expertise in a desired area.

Referring now to FIG. 8, search results are depicted for an expert search. An expert search window 130 depicts the name of an expert 132 along with the product, customer and technology information 122 in which the expert has expertise. In addition, a contact path 134 depicts a path through the people network of the requesting member 22 to the expert target individual 24 to aid member 22 in contacting target individual 24. A profile window 136 is presented by clicking expert name 132 or clicking along contact path 134 to aid the member 22 in obtaining direct contact with target individual 24. For each member of the people network, profile window 136 provides contact information such as phone, e-mail and ICQ address information and also an indication of the level of interaction between member 22 and the intervening or target member.

Figure 9:
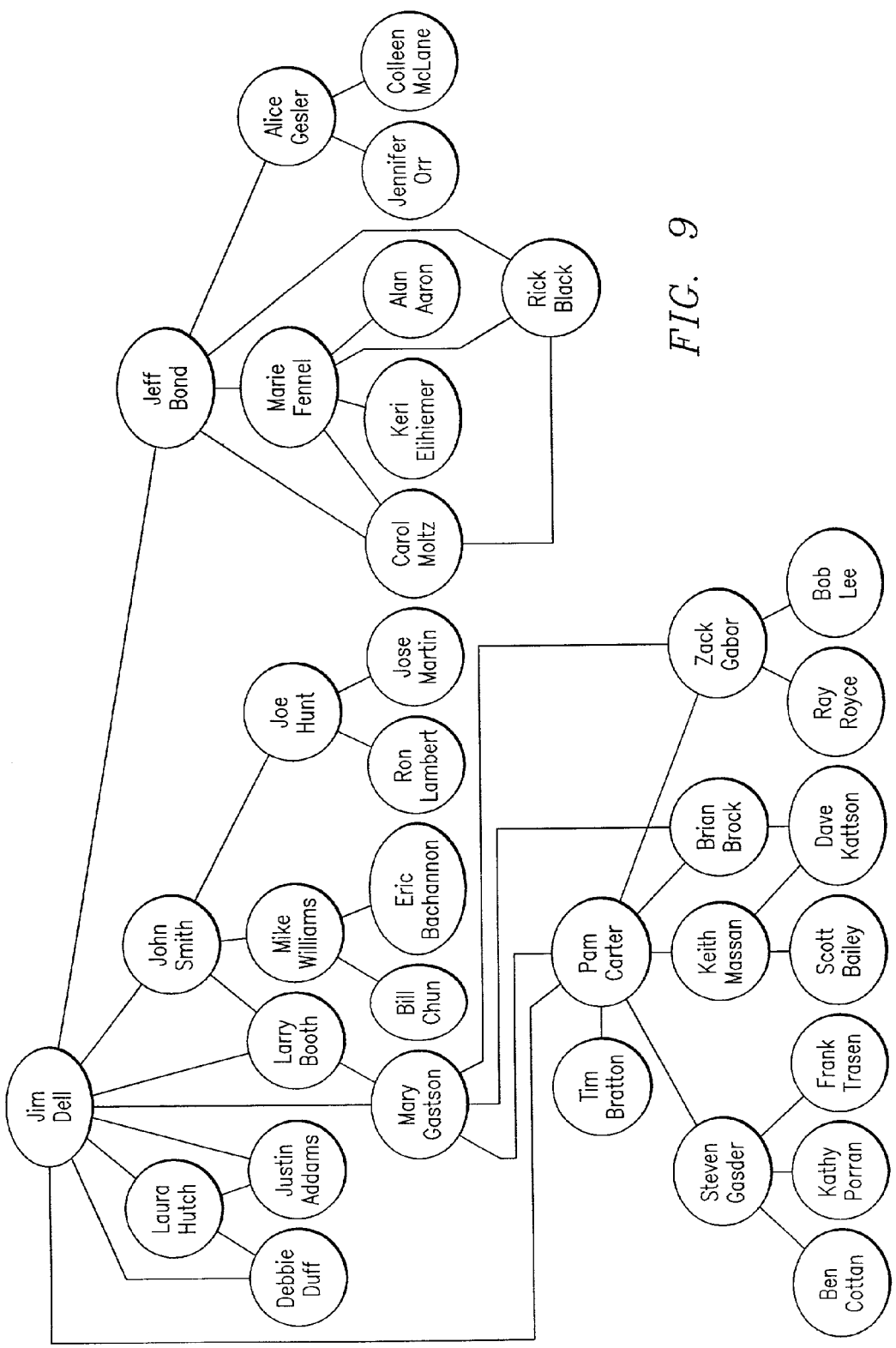
FIG. 9 depicts a graphical visualization of an organization member's people network.
Figure 10:
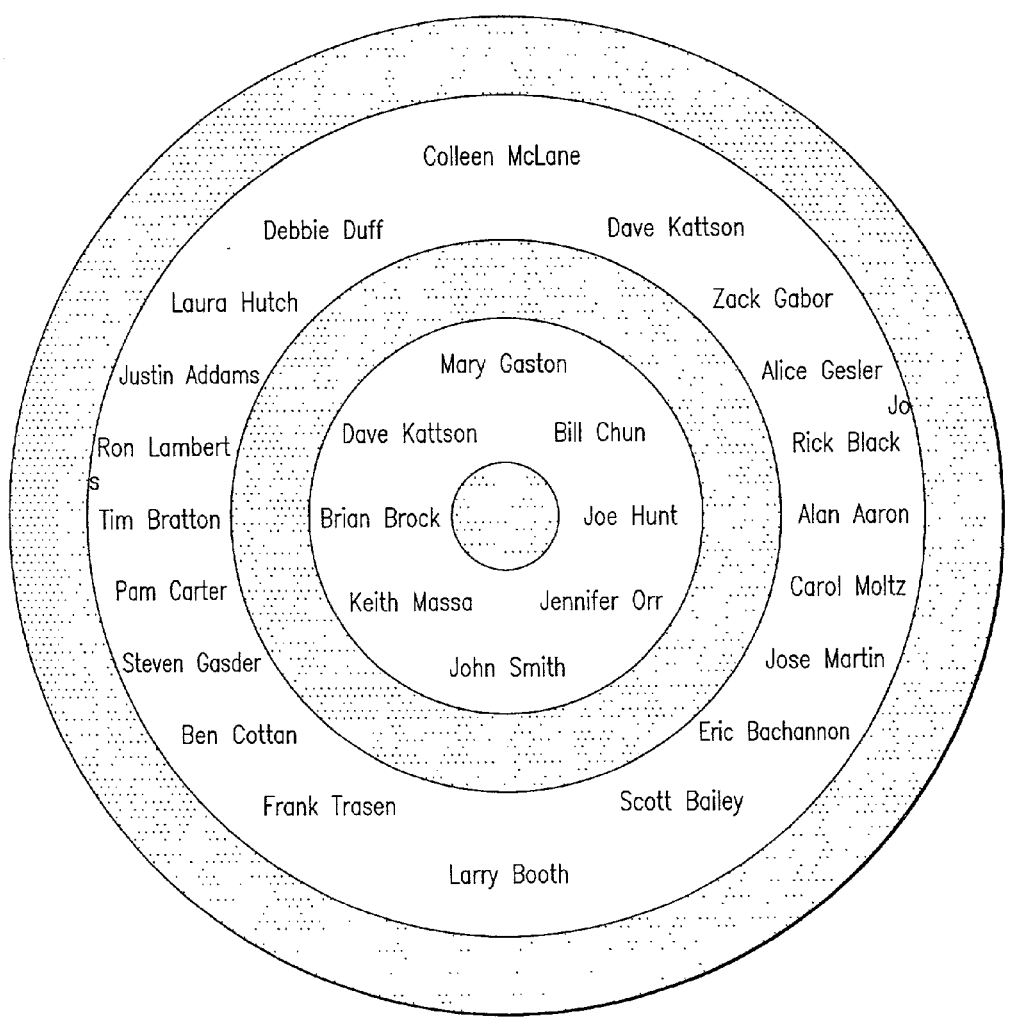
FIG. 10 depicts a graphical visualization of an organization member's strongest connections within the organization member's people network.

Referring now to FIGS. 9 and 10, graphical visualizations of a member's people network are depicted, such as may be selected by the member through window 126 of FIG. 7. FIG. 9 depicts contact paths derived from analysis of the member's network communications, including members of the organization having direct interaction with the requesting member and members of the organization having interactions with the requesting member's direct contacts. In one embodiment, the strength of the contact paths are depicted by using different colors between members, with the colors reflecting the level of interaction between each member. FIG. 10 depicts a bulls eye representation of member 22's people network with each successive bulls eye ring depicting different layers of the people network, the outer rings having less direct contact than the inner rings.

One helpful application of the graphical presentations of FIGS. 9 and 10 is that a member can browse his people network to update the representation of the network or to take actions to alter the level of interaction that the member has with other members. For instance, if the member's people network reflects an inaccuracy due to unusual network communications, the member can manually alter the level of interaction reflected between himself and a target member. As another example, if the member notes from his review of the graphical presentation that his interaction level with another member has dropped off, the member can reestablish interaction such as by writing emails to another member to re-establish communication.

A simplified example illustrates the present invention's advantage to an organization in solving workplace problems. A new hire at a software development company is tasked to use a custom tag library that was recently built on top of the company's web components package. The new hire recognizes that learning the tag library without help will take an excessive amount of time and so decides to seek expert help. Thus, the new hire enters a query in window 124 of FIG. 7, such as keyword search restricted to developers in an appropriate business unit. The new hire is provided with a list of suggested experts and selects an expert having a strong interaction rating with another intervening member of the organization that the new hire has a personal relationship. The new hire is able to seek the assistance of the expert by setting up a meeting through the intervening member.

Although the present invention has been described in detail, it should be understood that various changes, substitutions and alterations can be made hereto without departing from the spirit and scope of the invention as defined by the appending claims.

What is claimed is:

1. A method for selecting a contact path between a first member of an organization and a target individual, the method comprising:
   storing in a memory data associated with multiple members of the organization, wherein the data includes data that directly states one or more areas of expertise for the multiple members of the organization and the target individual is one of the multiple members of the organization;
   tracking network communications of the members of the organization;
   analyzing a level of interaction between the members of the organization based on the network communications to develop a people network;
   receiving data indicating an area of expertise desired by the first member of the organization;
   processing, using a computer system, the data that directly states the one or more areas of expertise for the multiple members of the organization to identify at least one or more target individuals of the organization, wherein the data associated with each target individual states that the target individual has expertise in the area of expertise desired by the first member of the organization;
   determining, using a computer system, a contact path between the first member of the organization and at least one of the one or more target individuals, the contact path including one or more members of the organization having at least a predetermined level of interaction with at least one of the first member and at least one of the target individuals and the contact path identifies one or more members of the organization that represent a proposed path through the people network for the first member to contact at least one of the target individuals, wherein the one or members of the contact path are distinct from the first member and the target individual; and
   providing the contact path to the first member.

2. The method of claim 1 further comprising:
   modeling the people network of the organization as a directed graph having plural nodes representing members of the organization and plural edges representing levels of interaction between members of the organization;
   wherein analyzing the level of interaction comprises analyzing the edges associated with the first member and the target individual.

3. The method of claim 2 wherein each edge comprises one or more weights, each weight representing a level of interaction for one type of network communication.

4. The method of claim 3 wherein one weight represents the level of interaction for e-mail communication.

5. The method of claim 3 wherein one weight represents the level of interaction for instant messenger communication.

6. The method of claim 3 wherein one weight represents the level of interaction for telephone communication.

7. The method of claim 1 further comprising:
   determining plural contact paths, each contact path representing a proposed path through the people network for the first member to contact a member of the organization having the desired expertise.

8. The method of claim 7 further comprising graphically depicting the plural contact paths as nodes representing members of the organization and edges representing the level of interaction between the members, each node and edge having an appearance that corresponds to the strength of the contact path.

9. The method of claim 1 wherein determining a contact path between the first member of the organization and the target individual comprises:
   determining a contact path between the first member of the organization and the target individual, wherein the contact path includes multiple intervening members of the organization between the first member and the target individual.

10. The method of claim 1 further comprising:
    providing data to a computer system, wherein the data causes the computer system to display the contact path and the expertise at least one of target individuals.

11. The method of claim 1 wherein storing in a memory further comprises:
    storing the data in a contact database and the data, including the data that states the one or more areas of expertise for the multiple members of the organization, is stored in the contact database.

12. A system for determining a people network within a communications network, the system comprising:
    a processor; and
    a memory, coupled to the processor, to store data associated with multiple members of the organization, wherein the data includes data that directly states one or more areas of expertise for the multiple members of the organization;
    wherein the memory further includes a people network model module interfaced with the communications network and interfaced with the memory and operable to model communications of the communications network;
    wherein the memory further includes code that is executable by the processor and the code comprises:
       an interaction level analyzer module interfaced with the people network model module and operable to apply a model of the communications to a level of interaction of the plural members to determine a people network representation; and
       a target locator and contact path module interfaced with the people network model and the interaction level analyzer module to:
       (i) accept a query from a first member for members of the organization having a desired expertise;
       (ii) process the data that directly states the one or more areas of expertise for the multiple members of the organization to identify at least one or more target individuals of the organization, wherein the data associated with each target individual states that each target individual has expertise in an area of expertise desired by the first member of the organization;
       (iii) determine a contact path between the first member of the organization and at least one of the one or more target individuals, the contact path including one or more members of the organization having at least a predetermined level of interaction with at least one of the first member and at least one of the target individuals and the contact path identifies one or more members of the organization that represent a proposed path through the people network for the first member to contact at least one of the target individuals, wherein the one or more members of the contact path are distinct from the first member and each target individual; and (iv) provide the first member with the contact path and the one or more target individuals based on the desired expertise and the level of interaction of the first member with members of the organization.

13. The system of claim 12 further comprising a graphical user interface operable to depict a visualization of the people network of a selected member of the organization.

14. The system of claim 13 wherein the graphical user interface depicts a selected member's people network representation as plural nodes interfaced with edges, the nodes representing members of the network and the lines representing the level of interaction between the members.

15. The system of claim 13 wherein the graphical user interface depicts the first member's people network representation as a bullseye having the first member at the center and members of the organization distributed in successive rings representing the level of interaction with the first member.

16. The system of claim 12 wherein the people network model module is further operable to model the people network of the organization as a directed graph having plural nodes and edges, the nodes representing members of the organization and the edges representing the level of interaction between nodes.

17. The system of claim 12 wherein the target locator and contact path module further comprises code executable by the processor to provide at least one of the one or more target individuals using a shortest path determination to prioritize target individuals in order of strongest contact path with the first member.

18. The system of claim 12 wherein the people network representation includes a contact path between the first member and the one or more target individuals and the contact path includes multiple intervening members of the organization between the first member and at least one of the one or more target individuals.

19. The system of claim 12 wherein the memory comprises a contact database and the data, including the data that states the one or more areas of expertise for the multiple members of the organization, is stored in the contact database.

20. The system of claim 12 wherein the code executable by the processor further comprises:
a display module to provide data to a computer system, wherein the data causes the computer system to display target individuals with rankings based on expertise.

21. A method of using a computer system for determining a target individual having expertise in a subject matter of interest to a first member of an organization, the method comprising executing code stored in the computer system for:
storing in a memory data associated with multiple members of the organization, wherein the data includes data that directly states one or more areas of expertise for the multiple members of the organization and the target individual is one of the multiple members of the organization;
processing the data that directly states the one or more areas of expertise for the multiple members of the organization to identify one or more members of the organization, wherein the data associated with each of the identified members of the organization states that the one or more members have expertise in the subject matter;
selecting one or more target individuals from only the one or more identified members having the expertise in the subject matter as stated in the data associated with each target individual;
determining a contact path between the first member of the organization and at least one of the one or more target individuals, the contact path including one or more members of the organization having at least a predetermined level of interaction with at least one of the first member and at least one of the target individuals and the contact path identifies one or more members of the organization that represent a proposed path through the people network for the first member to contact at least one of the target individuals, wherein the one or members of the contact path are distinct from the first member and each target individual; and
providing the first member with at least one of the contact paths to at least one of the target individuals.

22. The method of claim 21 wherein selecting one or more target individuals further comprises identifying members having contact paths of less than a predetermined number of intervening members between each target individual and the first member.

23. The method of claim 21 wherein providing the first member with contact paths comprises:
modeling a people network of the organization based on communications of members of the organization across a network; and
determining the contact paths by analyzing the level of interaction between members of the organization.

24. The method of claim 23 wherein modeling a people network comprises representing the people network as a directed graph having a node for each member of the organization, the nodes interfaced by edges representing levels of interaction.

25. The method of claim 24 wherein the communications network supports plural type of communication and wherein each edge has a set of weights, each type of communication having an associated weight.

26. The method of claim 23 wherein the communications comprise e-mail communications.

27. The method of claim 23 wherein the communications comprise instant message communications.

28. The method of claim 23 wherein the communications comprise phone communications.

29. The method of claim 23 wherein determining the contact paths comprises performing a strongest path analysis using the people network model to prioritize the one or more target individuals.

30. The method of claim 21 wherein providing the first member with at least one contact path to at least one of the target individuals comprises:
providing the first member with at least one contact path to at least one of the target individuals, wherein the contact path includes multiple intervening members of the organization between the first member and at least one of the target individual individuals.

31. The method of claim 21 further comprising:
providing data to a computer system for displaying the contact path and the expertise of at least one of the of target individuals.

32. The method of claim 21 wherein storing in a memory further comprises:
storing the data in a contact database and the data, including the data that states the one or more areas of expertise for the multiple members of the organization, is stored in the contact database.

* * * * *